United States Patent
Narendra Trivedi et al.

(10) Patent No.: US 10,536,274 B2
(45) Date of Patent: Jan. 14, 2020

(54) CRYPTOGRAPHIC PROTECTION FOR TRUSTED OPERATING SYSTEMS

(71) Applicant: Intel Corporation, Santa Clara, CA (US)

(72) Inventors: Alpa T. Narendra Trivedi, Hillsboro, OR (US); Siddhartha Chhabra, Hillsboro, OR (US); David M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 775 days.

(21) Appl. No.: 15/087,144

(22) Filed: Mar. 31, 2016

(65) Prior Publication Data

US 2017/0288874 A1 Oct. 5, 2017

(51) Int. Cl.
| | |
|---|---|
| *H04L 29/06* | (2006.01) |
| *H04L 9/32* | (2006.01) |
| *G06F 9/455* | (2018.01) |
| *G06F 21/57* | (2013.01) |

(52) U.S. Cl.
CPC ........ *H04L 9/3234* (2013.01); *G06F 9/45558* (2013.01); *G06F 21/575* (2013.01); *H04L 63/061* (2013.01); *G06F 2009/45583* (2013.01)

(58) Field of Classification Search
CPC .................................................. H04L 9/3234
See application file for complete search history.

(56) References Cited

U.S. PATENT DOCUMENTS

| | | | |
|---|---|---|---|
| 7,293,173 B2 * | 11/2007 | Field | G06F 12/126 711/E12.075 |
| 8,285,987 B1 * | 10/2012 | Kimball | G06F 21/14 713/164 |
| 9,812,138 B1 * | 11/2017 | Candebat | G10L 19/018 |
| 2015/0072726 A1 * | 3/2015 | Stern | H04W 88/06 455/552.1 |
| 2015/0347768 A1 * | 12/2015 | Martin | G06F 21/62 726/1 |
| 2017/0054557 A1 * | 2/2017 | Rozas | H04L 9/0891 |

* cited by examiner

*Primary Examiner* — Shawnchoy Rahman
(74) *Attorney, Agent, or Firm* — Grossman, Tucker, Perreault & Pfleger, PLLC (57) ABSTRACT

This disclosure is directed to cryptographic protection for trusted operating systems. In general, a device may comprise for example, at least processing circuitry and memory circuitry. The device may be virtualized in that the processing circuitry may load virtual machines (VMs) and a virtual machine manager (VMM) into the memory circuitry during operation. At least one of the VMs may operate as a trusted execution environment (TEE) including a trusted operating system (TOS). The processing circuitry may comprise encryption circuitry to cryptographically protect the TOS. For example, the VMM may determine a first memory range in which the TOS will be loaded and store data regarding the first memory range in a register within the encryption circuitry. The register configures the encryption circuitry to cryptographically protect the TOS.

20 Claims, 6 Drawing Sheets

Example TOS Range Register Parameters (TOS_PROT_STRUCT) 316'

| Field | Description |
|---|---|
| TOS_BASE | Physical memory base of the TOS memory |
| TOS_SIZE | The size of the TOS memory including security metadata |
| ENC_KEY | Key to be used for encryption of TOS memory |
| MAC_KEY | Key to be used for integrity protection of TOS memory |

CRYPTOGRAPHIC PROTECTION FOR TRUSTED OPERATING SYSTEMS

TECHNICAL FIELD

The present disclosure relates to device security, and more particularly, to a system for protecting device operation by securing regions of memory including trusted operating systems.

BACKGROUND

Electronic data security has become an area of great focus for development as more daily transactions become computerized. Computing devices are constantly being utilized to exchange financial data, personal identification data, etc. As a result, hackers may attempt to compromise computing devices to gain access to this valuable information. For example, malicious software (e.g., malware) may be loaded to passively or actively attack computing devices. Passive attacks may comprise malware observing data being passed between a processor and a memory to obtain passwords or other sensitive or confidential data. Active attacks may involve altering data stored in memory to trigger an atypical result such as allowing an unpermitted user to gain access to the computing device. In either instance, plaintext (unencrypted) data in the memory of a computing device, that is exchanged with a processor in the computing device, etc. is a major vulnerability.

Virtualized computing environments may offer some inherent protection from the above attacks. For example, a system-on-a-chip (SoC) for a mobile platform may support virtualization wherein at least one virtual machine (VM) executes an operating system (OS), etc. in a software-based environment that emulates actual device hardware. Thus, more than one VM may utilize a single set of device hardware to emulate multiple physical devices. An example implementation may include a virtual machine manager (VMM) or "hypervisor" to control at least one "trusted" VM or trusted execution environment (TEE) and at least one untrusted VM. Each VM may have an underlying OS to execute applications. A TEE may comprise a trusted OS (TOS) and a set of trusted services or applications executing in a trusted kernel. The untrusted VM may have a rich OS (e.g., Windows) and set of untrusted applications. Virtualization-based security technologies may rely on the isolation inherent between VMs to protect the applications executing on one VM from the applications executing on the rest of the VMs. A region of memory may be partitioned for each VM that is accessible only by the VM to ensure secure execution/storage of secrets like keys, etc. associated with the VM. To ensure complete security the TOS must also be protected from malicious software attacks. Security is currently maintained by storing the TOS in hidden memory ranges that are invisible to untrusted software, peripherals, etc. When executing trusted applications, the TOS is accessed via trusted kernel in the TEE. These activities may expose the hidden location of the TOS to attackers that may wish to compromise TEE security by accessing and/or corrupting the TOS. Existing TEE schemes do not provide protection against the attacks.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to cryptographic protection for trusted operating systems. In general, a device may comprise for example, at least processing circuitry and memory circuitry. The device may be virtualized in that the processing circuitry may load virtual machines (VMs) and a virtual machine manager (VMM) into the memory circuitry during operation. At least one of the VMs may operate as a trusted execution environment (TEE) including a trusted operating system (TOS). The processing circuitry may comprise encryption circuitry to cryptographically protect the TOS. For example, the VMM may determine a first memory range in which the TOS will be loaded and store data regarding the first memory range in a register within the encryption circuitry. The register configures the encryption circuitry to cryptographically protect the TOS. The encryption circuitry may also be configured to protect data associated with a TEE loaded in the memory circuitry and/or the VMM. For example, data associated with a TEE loaded in the memory circuitry may be protected in a second memory range that is also written to a register in the encryption circuitry. In addition, boot circuitry in the memory circuitry may comprise boot code that, when executed by the processing circuitry during initialization of the device, causes the processing circuitry to select a third memory range in which the VMM will be loaded, load the VMM, authenticate the VMM and write data regarding the third memory range to a register in the encryption circuitry. During operation of the device the processing circuitry may receive read/write requests. The processing circuitry may then determine whether the memory address for which the read/write request was targeted falls within the first or second memory ranges, and may set indicia usable by the encryption circuitry for processing the request prior to submitting the request to a memory controller also within the processing circuitry.

In at least one embodiment, an example device equipped with protection for a TOS may comprise at least memory circuitry into which VMs are loaded during operation of the device, at least one of the VMs operating as a TEE including at least a TOS. The example device may further comprise processing circuitry to at least load the virtual machines into the memory circuitry, the processing circuitry including encryption circuitry to cryptographically protect a first range of memory in the memory circuitry in which the trusted operating system is loaded.

In at least one embodiment, the encryption circuitry may be a memory encryption engine (MEE) included in processing circuitry based on Secure Guard Extensions (SGX) technology. Hardware reserved security metadata may also be loaded in the first range of memory during operation of the device. The encryption circuitry may comprise at least one register to identify ranges of memory to cryptographically protect. The at least one register may include a base address, a size of memory to protect and at least one cryptographic key corresponding to the range of memory. The encryption circuitry may also be to cryptographically protect a second range of memory in the memory circuitry in which data associated with the VM operating as a TEE will be loaded. The encryption circuitry may further be to cryptographically protect a third range of memory in the memory circuitry in which a VMM is loaded. For example, the memory circuitry may comprise boot circuitry including at least boot code to be executed by the processing circuitry during device initialization, the boot code causing the processing circuitry to select the third range of memory and to write data to the at least one register based on the selected third range of memory. The VMM may be to select the first range of memory in which the trusted operating system is to be loaded and write data based on the selected first range of memory to the at least one register.

In at least one embodiment, the processing circuitry may be to receive a request to read from or write to a memory address, determine whether the memory address is in the first memory range or second memory range and set an indicator based on whether the memory address falls within the first memory range or the second memory range. The processing circuitry may also comprise a memory controller, and the encryption circuitry is process the request based on the indicator prior to forwarding the request to the memory controller. Consistent with the present disclosure, an example method for protecting a TOS may comprise initializing a device, loading a VMM into memory circuitry in the device, selecting, using the VMM, a first range of memory in the memory circuitry in which to cryptographically protect a TOS and updating processing circuitry in the device based on the selected first memory range.

Figure 1:
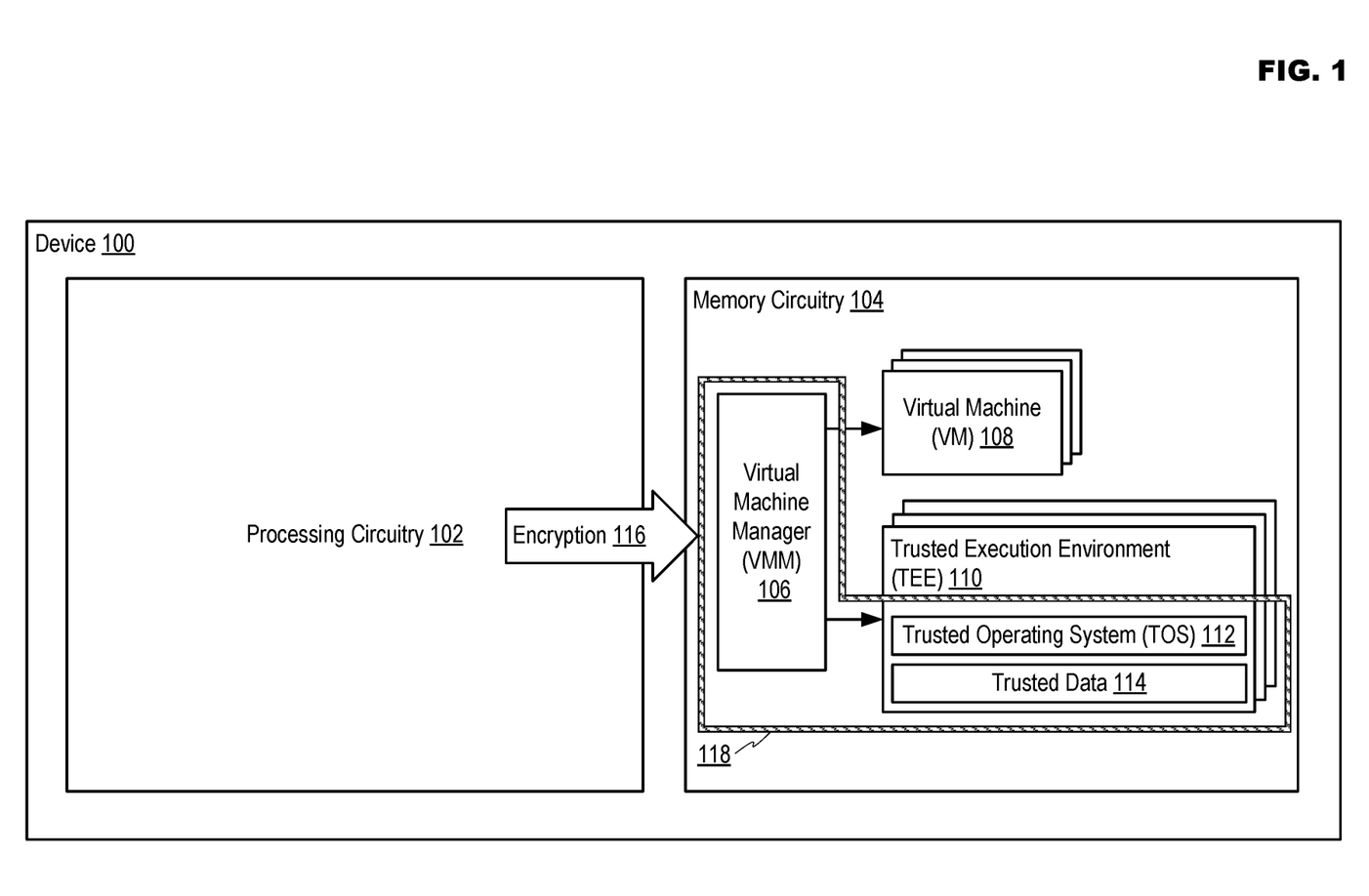
FIG. 1 illustrates an example of a device including cryptographic protection for trusted operating systems in accordance with at least one embodiment of the present disclosure.

FIG. 1 illustrates an example of a device including cryptographic protection for TOSs in accordance with at least one embodiment of the present disclosure. In describing embodiments consistent with the present disclosure reference may be made to technologies such as Software Guard Extensions (SGX) developed by the Intel Corporation, the components that may make up SGX and the manner in which SGX may operate. SGX has been employed herein to provide a readily comprehensible perspective for understanding the various disclosed embodiments, and is not intended to limit implementations to only employing SGX. The inclusion of an apostrophe after a drawing item number (e.g., 100') in the present disclosure may indicate that an example embodiment of the particular item is being illustrated merely for the sake of explanation herein. Moreover, as referenced herein "cryptographic protection" may generally comprise protecting the confidentiality of data stored within a range of memory range by encrypting the data stored within the memory range and controlling access to this data by managing access to at least one cryptographic key for use in encrypting/decrypting data read from/written to the memory range. The terms "VMM" and "hypervisor" may be used interchangeably herein to reference to a virtual machine manager. Acronyms used herein but inadvertently not defined are respectfully asserted to be readily determinable in view of the disclosure, figures and/or what is known in the art.

An example configuration for device 100 is disclosed in FIG. 1. Device 100 may be any apparatus equipped with computing resources (e.g., resources for processing data). While device 100 has been illustrated as contiguous in FIG. 1, device 100 may actually be made up of separate devices (e.g., coupled via wired or wireless communication). The devices making up device 100 may be configured to operate collaboratively such as, for example, in the instance of a desktop computer that may include a central processing unit (CPU) that is coupled to a separate monitor, peripheral devices, etc., a server rack comprising a plurality of data servers, etc. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen OS™ from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, server, a group of computing devices in a high performance computing (HPC) architecture, a smart television or other "smart" device, small form factor computing solutions (e.g., for space-limited applications, TV set-top boxes, etc.) like the Next Unit of Computing (NUC) platform from the Intel Corporation, etc.

Example device 100 may comprise at least processing circuitry 102 and memory circuitry 104. In general operation, processing circuitry 102 may, for example, perform various activities that manipulate the data stored in memory circuitry 104. Portions of memory circuitry 104 may be protected against unauthorized access by attackers. In at least one example implementation, device 100 may employ a memory protection system such as SGX to protect portions of memory circuitry 104. SGX provides a secure, hardware-encrypted computation and storage area within system memory, the contents of which cannot be deciphered by privileged code or even through applying hardware probes to memory bus. When memory circuitry 104 is protected by SGX it becomes impossible for an intruder to read the contents of the secure area. Protected data cannot be observed outside of SGX, making it inaccessible outside of SGX. SGX includes functionality wherein data identifying a "trusted" program (e.g., based at least in part on a cryptographic hash measurement of the content of the program) may be signed and stored inside the program. When the trusted program is loaded, processing circuitry 102 may verify that a current measurement of the trusted program is identical to a measurement previously embedded inside the program. The signature used to sign the embedded measurement is also verifiable because processing circuitry 102 may be provided with a public key that may be used to verify the signature at program load time. Malware cannot tamper with a protected program because its measurement would also be altered. Malware also cannot spoof the signature because the signing key may be secured with the program's author. Equipment, software, etc. will be described below that may be usable to implement security technology like SGX in device 100. However, consistent with the present disclosure, other security technologies existing now or developed in the future may also be used.

During normal operation, memory circuitry 104 may comprise VMM 106, at least one "untrusted" (e.g., unsecured) VM 108 and at least one TEE 110. Each TEE 110 may comprise, for example, TOS 112 and trusted data 114. In a typical device, TEE 110 does not provide any security guarantees to protect data against hardware attacks directed towards TOS 112. One example of a system that does not provide this protection is ARM® TrustZone®-based SoCs. Security may be enforced based on memory isolation provided across different VMs 108 and TEEs 110 (e.g., utilizing access control enforced in device hardware). For example, each VM 108 and TEE 110 may be allowed to access a range of physical memory defined within range registers (e.g., Base and Mask registers) controlled by the Hypervisor. For example, there may be a range of memory generally accessible (e.g., unsecured) in device 100, a range of memory accessible to TEEs 110, a range of memory accessible to only VMM 106 and a hidden range of memory that is not accessed (e.g., unless an attacker were to determine its location). VMM 106 may reconfigure the range registers to assign a new memory range for any VM 108 or TEE 110 in device 100. A unique identifier may be associated with each VM 108 and TEE 110 is tagged for every memory access and may be used to enforce access control based on the range registers.

TOS 112 is central to provide the trusted services guaranteed by a TEE 110. However, in existing systems TOS 112 is left virtually unprotected aside from placing TOS 112 into a hidden memory range. Consistent with the present disclosure, a system for actively protecting TOS 112 is considered. This mechanism may enable defending TOS 112 against hardware attacks through encryption circuitry integrated into processing circuitry 102. The basic principle involves VMM 106 picking a range for TOS 112 and programming this range into processing circuitry 102. As shown in FIG. 1, processing circuitry 102 may then utilize encryption 116 to secure at least TOS 112 in each TEE 110 as shown at 118. Depending on the type of data protection technology that is being used (e.g., SGX), trusted data 114 may also be protected by encryption 116 as shown at 118. In at least one embodiment that will be discussed below, VMM 106 may also be protected by encryption 116 as shown at 118. In this manner, some weaknesses in existing data protection systems may be reinforced utilizing resources that may already exist in processing circuitry 102.

Figure 2:
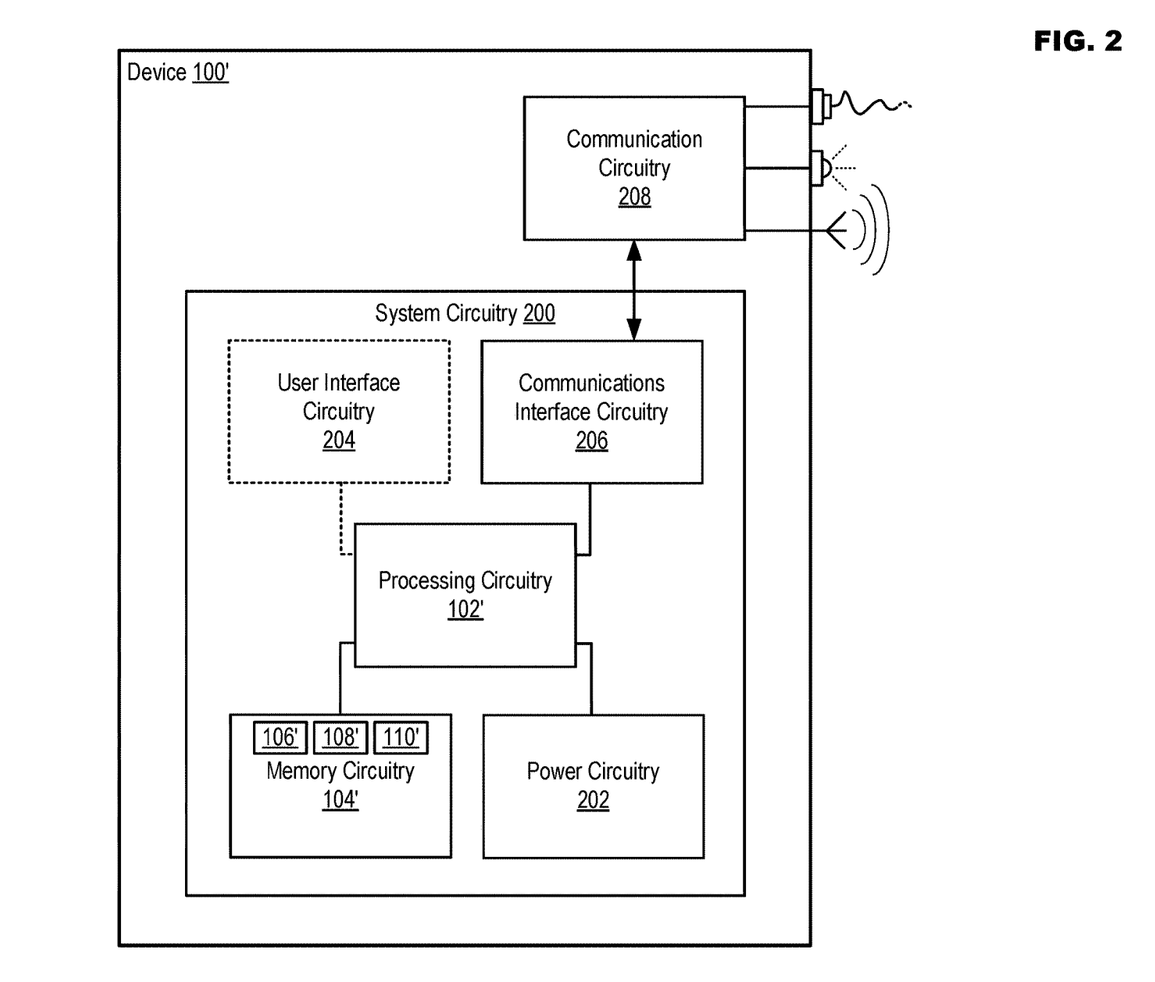
FIG. 2 illustrates an example configuration for a device usable in accordance with at least one embodiment of the present disclosure.

FIG. 2 illustrates an example configuration for a device usable in accordance with at least one embodiment of the present disclosure. Device 100' may be capable of performing any of the activities described above with respect to FIG. 1. However, device 100' is presented only as an example of an apparatus usable in embodiments consistent with the present disclosure, and is not intended to limit any of the various embodiments to any particular manner of implementation.

Device 100' may comprise system circuitry 200 to manage device operations. System circuitry 200 may include, for example, processing circuitry 102', memory circuitry 104', power circuitry 202, user interface circuitry 204 and communication interface circuitry 206. Device 100' may further include communication circuitry 208. While communication circuitry 208 is illustrated as separate from system circuitry 200, the example configuration shown in FIG. 2 has been provided merely for the sake of explanation. Some or all of the functionality associated with communication circuitry 208 may also be incorporated into system circuitry 200.

In device 100', processing circuitry 102' may comprise one or more processors situated in separate components, or alternatively one or more cores in a single component (e.g., an SoC), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing circuitry 102' may interact with other system components that may be operating at different speeds, on different buses, etc. in device 100'. Moreover, some or all of the functionality commonly associated with the support circuitry may also be included in the same physical package as the processor (e.g., such as in the Sandy Bridge, Broadwell and Skylake families of processors available from the Intel Corporation).

Processing circuitry 102' may be configured to execute various instructions in device 100'. Instructions may include program code configured to cause processing circuitry 102' to perform activities related to reading data, writing data, processing data, formulating data, converting data, transforming data, etc. Information (e.g., instructions, data, etc.) may be stored in memory circuitry 104'. Memory circuitry 104' may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory circuitry configured based on BIOS, UEFI, etc. to provide instructions when device 100' is activated, programmable memories such as electronic programmable ROMs (EPROMS), Flash, etc. Other fixed/removable memory may include, but are not limited to, example magnetic memories such as hard disk (HD) drives, etc., example electronic memories such as solid state flash memory (e.g., embedded multimedia card (eMMC), etc.), removable memory cards or sticks (e.g., micro storage device (uSD), USB, etc.), example optical memories such as compact disc-based ROM (CD-ROM), Digital Video Disks (DVD), Blu-Ray Disks, etc.

Power circuitry 202 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 204 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 204 may be incorporated within device 100' and/or may be coupled to device 100' via a wired or wireless communication medium. User interface circuitry 204 may be optional in certain circumstances such as, for example, a situation wherein device 100' is a server (e.g., rack server, blade server, etc.) that does not include user interface circuitry 204, and instead relies on another device (e.g., a management terminal) for user interface functionality.

Communication interface circuitry 206 may be configured to manage packet routing and other control functions for communication circuitry 208, which may be configured to support wired and/or wireless communications. In some instances, device 100' may comprise more than one set of communication circuitry 208 (e.g., including separate physical interface circuitry for wired protocols and/or wireless radios) managed by communication interface circuitry 206. Wired communications may include serial and parallel wired mediums such as, for example, Ethernet, USB, FireWire®, Thunderbolt™, Digital Video Interface (DVI), High-Definition Multimedia Interface (HDMI), DisplayPort™, etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth®, WLAN, Wi-Fi, etc.), long range wireless mediums (e.g., cellular wide-area radio communication technology, satellite-based communications, etc.), electronic communications via sound waves, long-range optical communications, etc. In one embodiment, communication interface circuitry 206 may be configured to prevent wireless communications that are active in communication circuitry 208 from interfering with each other. In performing this function, communication interface circuitry 206 may schedule activities for communication circuitry 208 based on, for example, the relative priority of messages awaiting transmission. While the embodiment disclosed in FIG. 2 illustrates communication interface circuitry 206 being separate from communication circuitry 208, it may also be possible for the functionality of communication interface circuitry 206 and communication circuitry 208 to be incorporated into the same circuitry.

The various examples of circuitry described in conjunction with different embodiments of the present disclosure may comprise hardware, or combinations of hardware and software in which, for example, the software may be implemented by the hardware to then configure certain functionality in the hardware, configure the hardware to perform one or more specific operations, configure other hardware, etc. For example, VMM 106', at least one VM 108' and at least one TEE 110' may reside in memory circuitry 104'. For example, program code corresponding to VMM 106', VM 108' and TEE 110' may be stored in NV memory within memory circuitry 104'. The program code may then be used to load any or all of these programmatic objects into volatile memory (e.g., RAM) during operation of device 100'. For example, processing circuitry 102' may execute the program code to transform processing circuitry 102' from a general purpose data processing circuitry (e.g., a microprocessor) into specialized circuitry to perform various operations such as described herein. For example, processing circuitry 102' may execute the program code to load VMM 106', at least one VM 108' and at least one TEE 110', to handle memory read/write requests related to the at least one VM 108' or the at least one TEE 110', etc.

Figure 3:
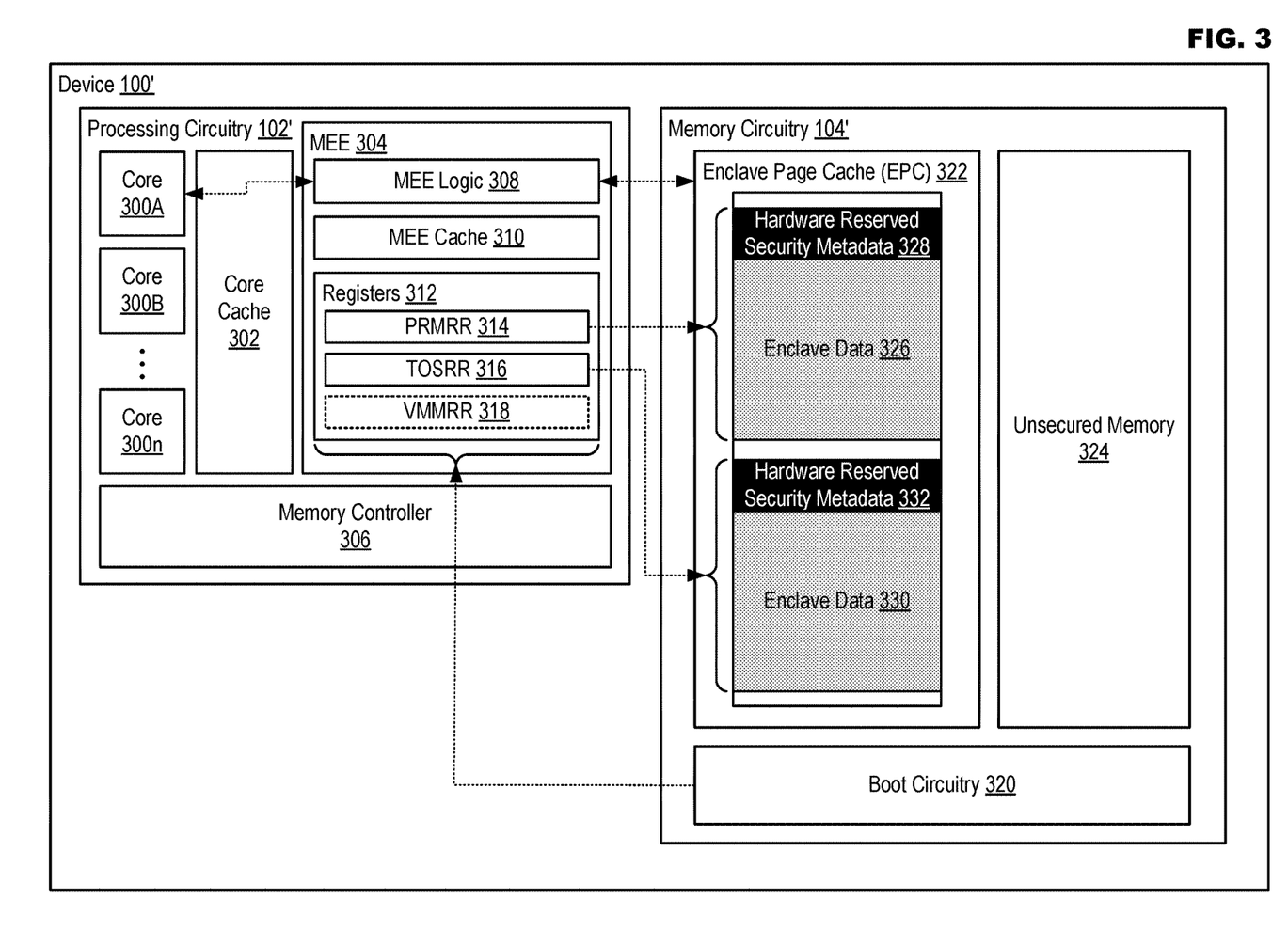
FIG. 3 illustrates an example implementation of a system for cryptographic protection for trusted operating systems in accordance with at least one embodiment of the present disclosure.

FIG. 3 illustrates an example implementation of a system for cryptographic protection for trusted operating systems in accordance with at least one embodiment of the present disclosure. FIG. 3 shows an example implementation utilizing a device 100' with SGX-enabled processing circuitry 102'. Processing circuitry 102' may include, for example, at least one processing core 300 (e.g., core 300A, core 300B . . . core 300n, collectively "cores 300A . . . n"), core cache 302, memory encryption engine (MEE) 304 (e.g., "encryption circuitry") and memory controller 306. Cores 300A . . . n may perform various data processing operations using data from core cache 302. As referenced herein, a "cache" may comprise local volatile memory to hold data that may be utilized during a data processing operation. Core cache 302 may include a plurality of separate memory areas arranged in levels with the outermost level (e.g., from which data is transmitted to, and received from, MEE logic 308) being the last level cache (LLC). Core cache 108 may help to speed up data processing by avoiding having to repeatedly retrieve data that may be used more than once during a data processing operation from memory circuitry 104'. Memory controller 306 may control how processing circuitry 102' accesses memory circuitry 104' including, for example, how data may be read from memory circuitry 104 and written to memory circuitry 104.

MEE 304 may provide confidentiality, integrity, and replay protection to at least enclave page cache (EPC) 322. In at least one embodiment, MEE 304 may decrypt data as it moves into processing circuitry 102' from EPC 322 and encrypt data as it moves out of processing circuitry 102' before getting stored in EPC 322, and may generate a message authentication code (MAC) to guarantee integrity of data when it is resident in off-chip memory 104'. Moreover, MEE 304 may also maintain a replay tree (e.g., a tree of authenticated counters) that acts as a version tree to protect against replay attacks wherein an attacker may "replay" a previous access using data from a previous memory access in an attempt to gain unauthorized access to protected memory.

MEE 304 may include, for example, MEE logic 308, MEE cache 310 and registers 312. MEE logic 308 may perform a variety of operations (e.g., data encryption, data decryption, key management, etc.) to cryptographically protect portions of memory circuitry 104'. MEE cache 310 may be to hold security metadata at least during the memory protection operations. SGX architecture may define how the enclave memory (e.g., EPC 322) is configured. For example, the BIOS may use range registers exposed by MEE 304 to define ranges of memory that will be encrypted to protect the data associated with at least one TEE 110. In existing implementations of SGX, the BIOS may be responsible for finding a contiguous range of memory to be reserved for SGX. Current platforms support up to 128 MB of protected memory and may be scaled up to 128 GB for server platforms and scaled down to 16 MB for small device and/or mobile platforms. The range of memory selected by the BIOS for SGX is programmed into MEE 304 via processor reserved memory range register (PRMRR) 314. PRMRR 314 may include, for example, at least a base register (PRMRR_BASE) and a mask register (PRMRR_MASK) utilized by MEE 304 to determine the base and size of physical memory to protect for SGX (e.g., EPC 322). The system integration of MEE 304 may be performed via adapter circuitry (not illustrated) that may also be responsible for routing requests to MEE 304. The adapter circuitry may perform a range match or receive the memory range information in a request. In the latter case, the range match may be done by an upstream agent to decide on the particular requests to be routed to MEE 304.

Consistent with the present disclosure, device 100' may be configured to allow MEE 304 to also protect a range of memory selected by VMM 106 for TOS 112. To establish protection for TOS 112, VMM 106 may be reconfigured to select a memory allocation for TOS 112, VMM 106 may reprogram MEE 304 to allow for trusted computing base (TCB) separation (e.g., allow MEE 304 to keep security-essential resources in device 100' segregated), and MEE 304 may be reconfigured to support protecting TOS 112.

As illustrated in FIG. 3, memory circuitry 104' may comprise, for example, boot circuitry 320, EPC 322 and unsecured memory 324. Boot circuitry 320 may include at least memory to store boot code to be executed by processing circuitry 102' when device 100' is initialized (e.g., powered up from a power down state, rebooted, etc.). Unsecured memory 324 may be memory that is not protected with a data protection scheme such as, for example, SGX. As discussed above, VMM 106 may allocate space for all VMs 108 and TEEs 110 that are running on device 100'. In at least one embodiment, VMM 106 may also allocate the memory space (e.g., a range of memory) required to protect TOS 112 along with the space required for security metadata. Referring to EPC 322 in FIG. 3, PRMRR 314 are shown to reserve enclave data 326 (e.g., a range of memory for data associated with TEE 110) and corresponding hardware reserved security metadata 328. In a similar manner, TOS range register (TOSRR) 316 are shown to reserve enclave data 330 (e.g., a range of memory for TOS 112) and corresponding hardware reserved security metadata 332. In practice, this may result in VMM 106 reserving a range of memory that is 1.25 times the size of the size of TOS 112, where the additional 25% will be used for security metadata 332 (e.g., used for encrypting and integrity protecting the TOS data when resident in memory).

The range of memory for TOS 112 selected by VMM 106 is, in effect, another range in addition to the range defined by PRMRR 314 that will be protected by MEE 304. For MEE 304 to be aware of this region, VMM 106 will need to program the TOS region base and size to MEE 304. TCB for SGX and VMM 106 may be maintained by using a separate set of cryptographic keys. SGX keys are programmed by microcode (ucode) before SGX is initiated on device 100'. Two potential ways that VMM 106 may program keys for MEE 304 include via instruction set architecture (ISA) support or via memory-mapped I/O (MMIO). For example, a new instruction may be introduced into the ISA to allow VMM 106 to communicate TOS protection parameters to MEE 304. Alternatively, new MMIO registers may be introduced, wherein MEE 304 may be programmed by VMM 106 with the TOS-protection parameters. The MMIO registers may be virtualized to ensure that only VMM 106 may program the registers.

MEE 304 may maintain address mappings to determine addresses for security metadata (e.g., to verify the integrity of a data line that is loaded). As discussed above, MEE 304 may be integrated using adapter circuitry. Taking an example of SoC integration, the adapter circuitry may use a custom interface with MEE 304 for sending requests and receiving responses. This interface may be updated to allow MEE 304 to make the distinction between PRMRR 314 and TOSRR 316 so that the correct set of address mappings and keys may be used. MEE 304, the adapter circuitry or an upstream entity may perform a range check to determine if an incoming memory requests is in PRMRR 314 or TOSRR 316. In at least one embodiment, the request tag may be extended to dedicate a bit to indicating the range match to allow MEE 304 to employ the correct key. The adapter circuitry may then be extended to carry this additional bit to MEE 304.

Consistent with the present disclosure, the attack surface may be expanded to also include hardware attacks. Before VMM 106 may start to implement the protections described herein, an attack may be able to subvert VMM 106 by compromising the boot process. To prevent such an attack, VMM 106 may also be protected from the initialization of device 100'. In at least one embodiment, the boot process may verify VMM 106 before memory circuitry 104' is initialized (e.g., using cache as RAM mode), and may then hand over the control to VMM 106 only after it has been verified. While this may narrow the window for an attacker, there is still a time-of-use-to-time-of-check vulnerability window post VMM 106 verification but prior to use. An attacker may be able to modify the VMM code when it is resident in memory (e.g., the code that affords the various hardware protections described herein). To afford complete protection, VMM 106 itself may need to be provided hardware protection using MEE 304 such as described above.

For example, an authenticated module (e.g., loaded from boot code in boot circuitry 320) may load VMM 106 during the initialization of device 100'. For example, SGX may employ an authenticated code module loaded by BIOS to verify the SGX memory setup done by the BIOS. The authenticated module may verify the authenticity of VMM 106, and load VMM 106 into a range of memory that may then be programmed to VMM range register (VMMRR) 318 to allow MEE 304 to cryptographically protect VMM 106. The range of memory into which VMM 106 will be loaded may be determined by the BIOS (e.g., similar to PRMRR 314) and communicated to the authenticated code module during device initialization, which may then program the range to MEE 304. VMM 106 may additionally verify the registers that are programmed in MEE 304 to ensure that its memory range is protected by the hardware. VMM 106 may further ensure that all its pages are resident in the protected address range. An alternate implementation consistent with the present disclosure may be orchestrated by boot circuitry 320. Boot circuitry 320 may include a physical memory location not exposed to other memory in memory circuitry 104' that is executed at device initialization. Boot circuitry 320 may measure (e.g., hash and check) VMM code line-by-line as the code is loaded into the memory range defined in VMMRR 318, and once verified then it may switch control to VMM 106. VMM 106 may then take control and extend this protection to additional modules it may measure during loading into their memory ranges.

Figure 4:
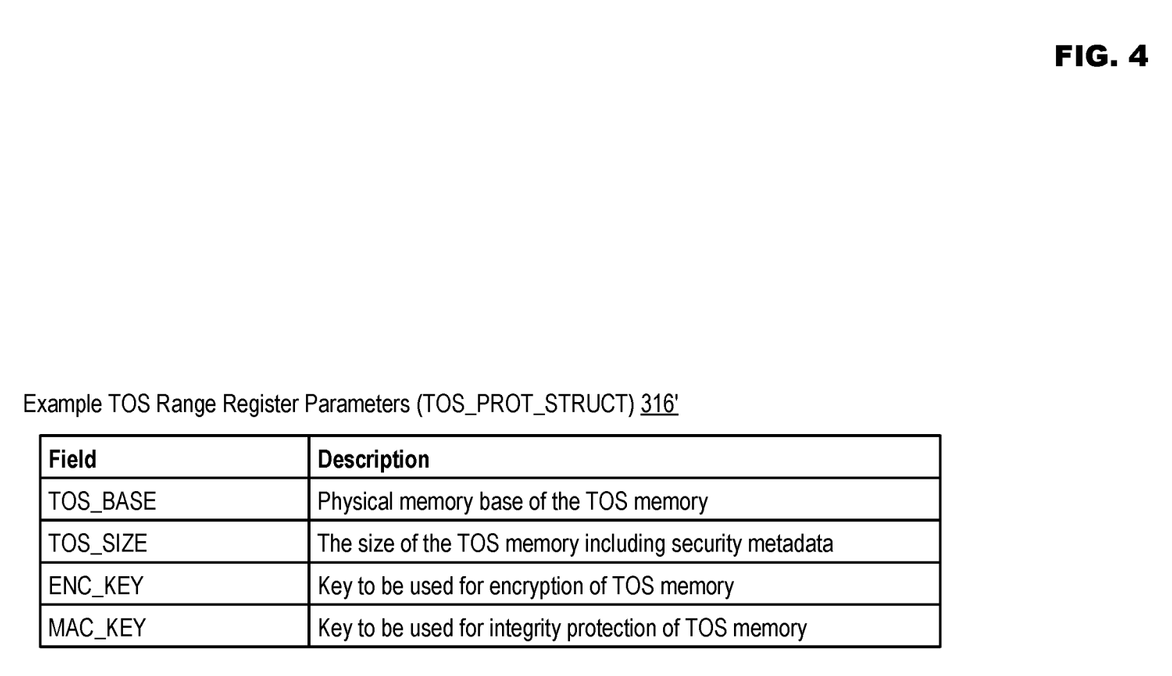
FIG. 4 illustrates an example register data structure to define cryptographic protection for trusted operating systems in accordance with at least one embodiment of the present disclosure.

FIG. 4 illustrates an example register data structure to define cryptographic protection for trusted operating systems in accordance with at least one embodiment of the present disclosure. Example TOSRR parameters (e.g., TOS_PROT_STRUCT) are disclosed in FIG. 4 at 316'. For example, TOS_BASE may indicate a physical memory base of the TOS memory, TOS_SIZE may indicate a size of the TOS size (e.g., including the security metadata), ENC_KEY may be at least one cryptographic key to be used for encryption of TOS memory and MAC_KEY may be at least one key to be used for integrity protection of TOS memory. VMM 106 may populate the TOS_PROT_STRUCT by, for example, storing the base and size for the TOS in the appropriate fields and generating two 128-bit keys for encryption and integrity protection (e.g., keys may be generated using a digital random number generator (DRNG) from the Intel Corporation). VMM 196 may then invoke a new instruction (e.g., VMPROG_MEE) that takes TOS_PROT_STRUCT as a parameter. The instruction ucode may program the fields in TOS_PROT_STRUCT to MEE 304 (e.g., using "Funny I/O" over a sideband interface).

In an implementation employing MMIO, the TOS_PROT_STRUCT parameters may be programmed to MEE 304, which may expose corresponding MMIO registers. VMM 106 may virtualize these MMIO registers to ensure that they can only be programmed by VMM 106 and not tampered with by any other software entity on the platform. The support required in MEE 304 may vary depending on implementation. Existing core MEE hardware may be used without modification. However, in addition to protecting the traditional PRMRR range, MEE 304 may also protect the range of memory set in MEE 304. MEE may expose additional registers (e.g., TOSRR 316) to receive the TOS_PROT_STRUCT from VMM 106. These registers may be implemented differently depending on whether the implementation uses an ISR instruction or MMIO. If an ISR instruction is utilized, MEE 304 may expose funny I/O registers that allow access to only ucode, and optionally to precompiled code (p-code), if the registers are not saved and restored across software-invisible power transitions (e.g., S0ix power states, auto-PG, etc.). If the registers are implemented as MMIO registers, MEE 304 may expose these registers over, for example, the memory controller hub base address register (MCHBAR) allowing VMM 106 to program them. VMM 106 may be responsible for access control of these registers.

Figure 5:
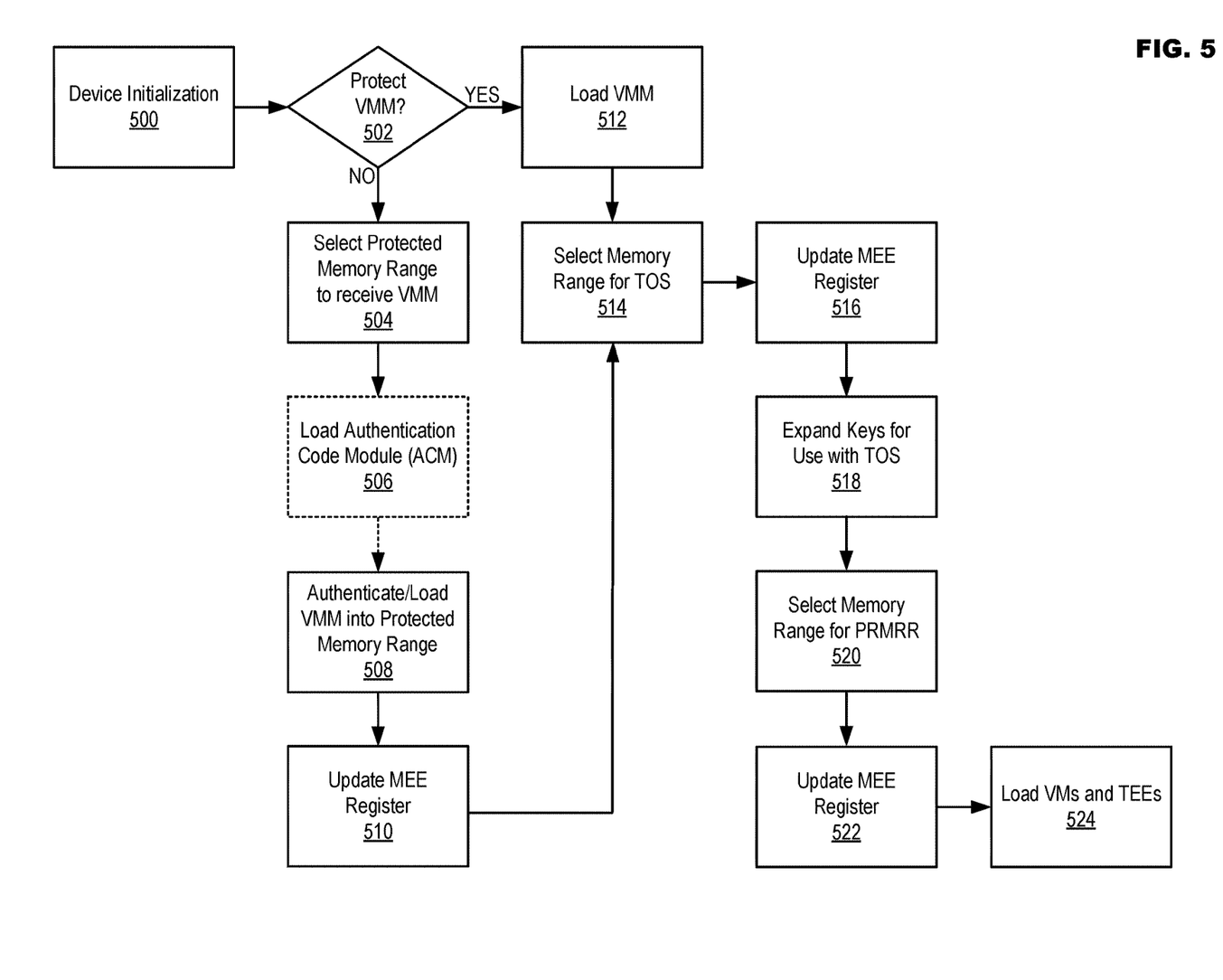
FIG. 5 illustrates example operations for establishing cryptographic protection for trusted operating systems in accordance with at least one embodiment of the present disclosure.

FIG. 5 illustrates example operations for establishing cryptographic protection for trusted operating systems in accordance with at least one embodiment of the present disclosure. In operation 500 a device may be initialized. A determination may then be made in operation 502 as to whether to protect the VMM (e.g., whether to verify the VMM and load the VMM into a range of memory that is protected by encryption circuitry). If in operation 502 it is determined that the VMM is to be protected, then in operation 504 a range to memory to receive the VMM may be selected. In one embodiment, the range of memory may be selected in response to boot code executed by processing circuitry during initialization of the device. Operation 506 may be optional in that execution of operation 506 may be implementation-dependent. In operation 506 an authentication code module (ACM) may be loaded (e.g., by the boot code) to authenticate the VMM. In operation 508 either the ACM (if loaded) or the boot code may authenticate the VMM and then load the VMM into the protected memory range. An MEE register corresponding to the VMM may be updated in operation 510 so that the MEE cryptographically protects the VMM.

If in operation 502 a determination is made not to protect the VMM, then in operation 512 the VMM may be loaded without protection. Operation 514 may follow operations 510 or 512. In operation 514 the VMM may select a memory range in which to protect the TOS. The MEE register corresponding to the TOS may then be updated in operation 516, and keys for use with the TOS may be expanded in operation 518. Similarly, a memory range for protecting data associated with at least one TEE may be selected in operation 520. A register corresponding to where the TEE data will be stored (e.g., PRMRR) may then be updated in operation 522. At least one VM and at least one TEE may then be loaded in operation 524.

Figure 6:
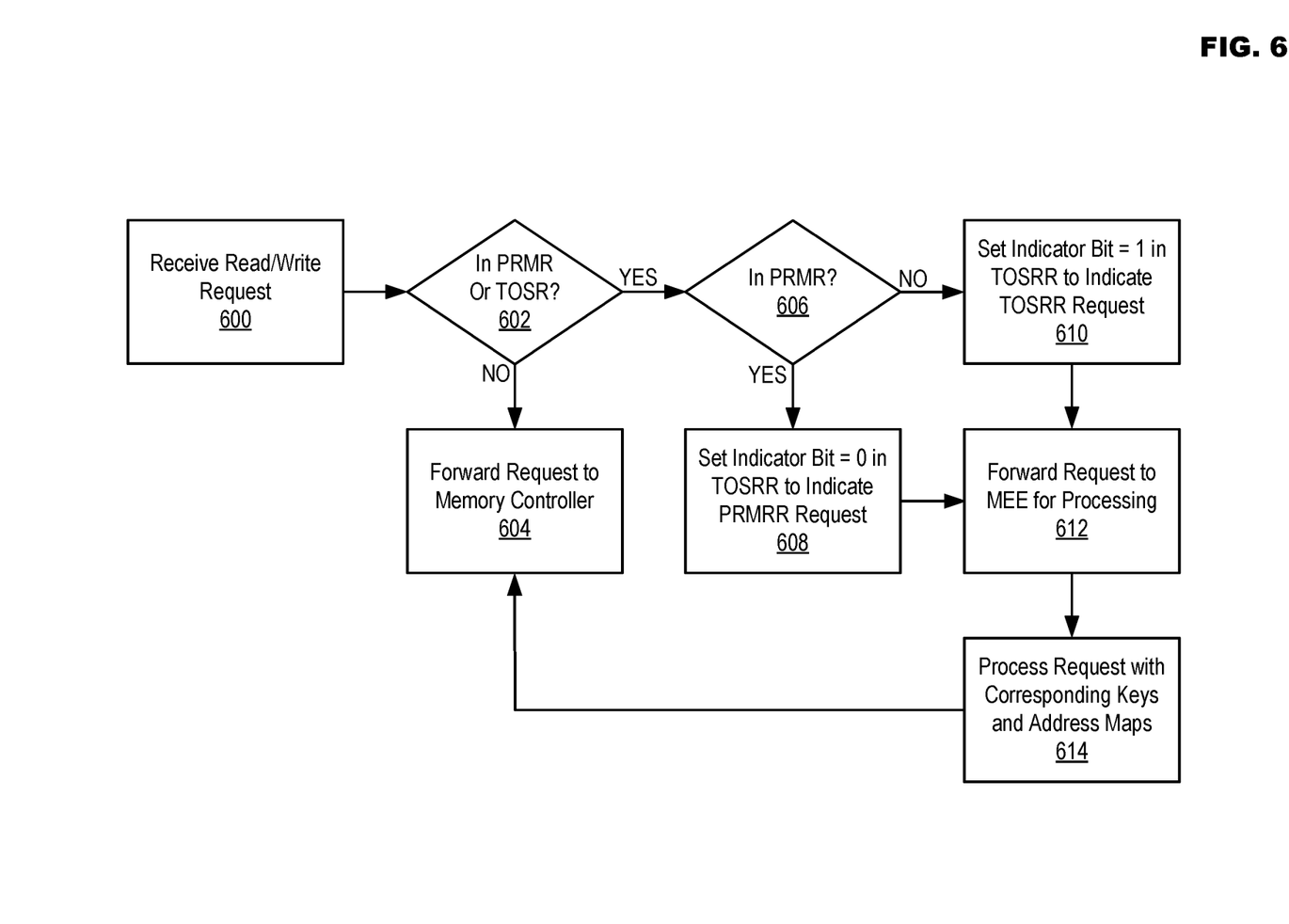
FIG. 6 illustrates example operations for maintaining cryptographic protection for trusted operating systems in accordance with at least one embodiment of the present disclosure.

FIG. 6 illustrates example operations for maintaining cryptographic protection for trusted operating systems in accordance with at least one embodiment of the present disclosure. In operation 600 a read and/or write (read/write) request may be received in a device (e.g., by processing circuitry). A determination may then be made in operation 602 as to whether a memory address to read/write included in the memory request falls within a processor reserved memory range (PRMR) or a trusted operating system range (TOSR). If in operation 602 it is determined that the memory address does not fall within the PRMR or TOSR range, then in operation 604 the request may be forwarded to a memory controller in the processing circuitry.

A determination in operation 602 that the memory address corresponding to the request falls within the PRMR or TOSR in operation 602 may be followed by a further determination in operation 606 as to whether the memory address falls within the PRMR. If in operation 606 it is determined that the memory address falls within the PRMR, then in operation 608 an indicator bit may be set (e.g., ="0") in the TOSRR to indicate that the request is a PRMRR request. If in operation 606 it is determined that the memory address does not fall within the PRMR, then in operation 610 the indicator bit may be set (e.g., ="1") in the TOSRR to indicate that the request is a TOSRR request. Following operation 608 or 610, in operation 612 the read/write request may then be forwarded to the MEE for processing. In operation 614 the MEE may process the request in accordance with the indicator bit setting. Processing the request may involve, for example, determining corresponding cryptographic keys and address maps based on whether the request was previously determined to be a PRMRR request or TOSRR request. Operation 614 may be followed by a return to operation 604 to forward the request to the memory controller.

While FIGS. 5 and 6 illustrate operations according to different embodiments, it is to be understood that not all of the operations depicted in FIGS. 5 and 6 are necessary for other embodiments. Indeed, it is fully contemplated herein that in other embodiments of the present disclosure, the operations depicted in FIGS. 5 and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, this disclosure is directed to cryptographic protection for trusted operating systems. In general, a device may comprise for example, at least processing circuitry and memory circuitry. The device may be virtualized in that the processing circuitry may load virtual machines (VMs) and a virtual machine manager (VMM) into the memory circuitry during operation. At least one of the VMs may operate as a trusted execution environment (TEE) including a trusted operating system (TOS). The processing circuitry may comprise encryption circuitry to cryptographically protect the TOS. For example, the VMM may determine a first memory range in which the TOS will be loaded and store data regarding the first memory range in a register within the encryption circuitry. The register configures the encryption circuitry to cryptographically protect the TOS.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system cryptographic protection for trusted operating systems.

According to example 1 there is provided a device equipped with protection for a trusted operating system. The device may comprise memory circuitry into which virtual machines are loaded during operation of the device, at least one of the virtual machines operating as a trusted execution environment including at least a trusted operating system and processing circuitry to at least load the virtual machines into the memory circuitry, the processing circuitry including encryption circuitry to cryptographically protect a first range of memory in the memory circuitry in which the trusted operating system is loaded.

Example 2 may include the elements of example 1, wherein the encryption circuitry is a memory encryption engine included in processing circuitry based on Secure Guard Extensions (SGX) technology.

Example 3 may include the elements of any of examples 1 to 2, wherein hardware reserved security metadata is also loaded in the first range of memory during operation of the device.

Example 4 may include the elements of any of examples 1 to 3, wherein the encryption circuitry comprises at least one register to identify ranges of memory to cryptographically protect.

Example 5 may include the elements of example 4, wherein the encryption circuitry comprises a processor reserved memory range register, a trusted operating system range register and a virtual machine manager range register.

Example 6 may include the elements of any of examples 4 to 5, wherein the at least one register includes a base address, a size of memory to protect and at least one cryptographic key corresponding to the range of memory.

Example 7 may include the elements of example 6, wherein the at least one cryptographic key comprises a cryptographic key for use in encryption or decryption of the range of memory in which the trusted operating system is stored and a cryptographic key for use in integrity protection of the memory range in which the trusted operating system is stored.

Example 8 may include the elements of any of examples 4 to 7, wherein the encryption circuitry is to cryptographically protect a second range of memory in the memory circuitry in which data associated with the virtual machine operating as a trusted execution environment will be loaded.

Example 9 may include the elements of example 8, wherein hardware reserved security metadata is also loaded in the second range of memory during operation of the device.

Example 10 may include the elements of any of examples 4 to 9, wherein the encryption circuitry is to cryptographically protect a third range of memory in the memory circuitry in which a virtual machine manager is loaded.

Example 11 may include the elements of example 10, wherein the memory circuitry comprises boot circuitry including at least boot code to be executed by the processing circuitry during device initialization, the boot code causing the processing circuitry to select the third range of memory and to write data to the at least one register based on the selected third range of memory.

Example 12 may include the elements of any of examples 10 to 11, wherein the virtual machine manager is to select the first range of memory in which the trusted operating system is to be loaded and write data based on the selected first range of memory to the at least one register.

Example 13 may include the elements of any of examples 1 to 12, wherein the processing circuitry is to receive a request to read from or write to a memory address, determine whether the memory address is in the first memory range or second memory range and set an indicator based on whether the memory address falls within the first memory range or the second memory range.

Example 14 may include the elements of example 13, wherein the processing circuitry comprises a memory controller and the encryption circuitry is to process the request based on the indicator prior to forwarding the request to the memory controller.

Example 15 may include the elements of any of examples 1 to 14, wherein the encryption circuitry comprises at least one register to identify ranges of memory to cryptographically protect, the at least one register including a base address, a size of memory to protect and at least one cryptographic key corresponding to the range of memory.

According to example 16 there is provided a method for protecting a trusted operating system. The method may comprise initializing a device, loading a virtual machine manager into memory circuitry in the device, selecting, using the virtual machine manager, a first range of memory in the memory circuitry in which to cryptographically protect a trusted operating system and updating processing circuitry in the device based on the selected first memory range.

Example 17 may include the elements of example 16, wherein the trusted operating system is associated with a virtual machine operating as a trusted execution environment to be loaded in the memory circuitry.

Example 18 may include the elements of any of examples 16 to 17, and may further comprise selecting, utilizing the virtual machine manager, a second range of memory in the memory circuitry in which to cryptographically protect data associated with the virtual machine operating as a trusted execution environment and updating processing circuitry in the device based on the selected second memory range.

Example 19 may include the elements of example 18, wherein loading the virtual machine manager may comprise executing boot code using the processing circuitry, selecting a third memory range in which to cryptographically protect the virtual machine manager, loading the virtual machine manager, authenticating the virtual machine manager and updating the processing circuitry based on the selected third memory range.

Example 20 may include the elements of example 19, and may further comprise loading a code authentication module to authenticate the virtual machine manager.

Example 21 may include the elements of any of examples 18 to 20, wherein updating the processing circuitry comprises writing data regarding to a register associated with encryption circuitry in the processing circuitry.

Example 22 may include the elements of example 21, and may further comprise receiving a request to read from or write to a memory address, determining whether the memory address is in the first memory range or second memory range and setting an indicator based on whether the memory address falls within the first memory range or the second memory range.

Example 23 may include the elements of example 22, and may further comprise processing, using the encryption circuitry, the request based on the indicator prior to forwarding the request to a memory controller in the processing circuitry.

Example 24 may include the elements of any of examples 21 to 23, and may further comprise receiving a request to read from or write to a memory address, determining whether the memory address is in the first memory range or second memory range, setting an indicator based on whether the memory address falls within the first memory range or the second memory range and processing, using the encryption circuitry, the request based on the indicator prior to forwarding the request to a memory controller in the processing circuitry.

According to example 25 there is provided a system including at least one device, the system being arranged to perform the method of any of the above examples 16 to 24.

According to example 26 there is provided a chipset arranged to perform the method of any of the above examples 16 to 24.

According to example 27 there is provided at least one machine readable medium comprising a plurality of instructions that, in response to be being executed on a computing device, cause the computing device to carry out the method according to any of the above examples 16 to 24.

According to example 28 there is provided at least one device equipped to protect a trusted operating system, the at least one device being arranged to perform the method of any of the above examples 16 to 24.

According to example 29 there is provided a system for protecting a trusted operating system. The system may comprise means for initializing a device, means for loading a virtual machine manager into memory circuitry in the device, means for selecting, using the virtual machine manager, a first range of memory in the memory circuitry in which to cryptographically protect a trusted operating system and means for updating processing circuitry in the device based on the selected first memory range.

Example 30 may include the elements of example 29, wherein the trusted operating system is associated with a virtual machine operating as a trusted execution environment to be loaded in the memory circuitry.

Example 31 may include the elements of any of examples 29 to 30, and may further comprise means for selecting, utilizing the virtual machine manager, a second range of memory in the memory circuitry in which to cryptographically protect data associated with the virtual machine operating as a trusted execution environment and means for updating processing circuitry in the device based on the selected second memory range.

Example 32 may include the elements of example 31, wherein the means for loading the virtual machine manager comprise means for executing boot code using the processing circuitry, means for selecting a third memory range in which to cryptographically protect the virtual machine manager, means for loading the virtual machine manager, means for authenticating the virtual machine manager and means for updating the processing circuitry based on the selected third memory range.

Example 33 may include the elements of example 32, and may further comprise means for loading a code authentication module to authenticate the virtual machine manager.

Example 34 may include the elements of any of examples 31 to 33, wherein the means for updating the processing circuitry comprise means for writing data regarding to a register associated with encryption circuitry in the processing circuitry.

Example 35 may include the elements of example 34, and may further comprise means for receiving a request to read from or write to a memory address, means for determining whether the memory address is in the first memory range or second memory range and means for setting an indicator based on whether the memory address falls within the first memory range or the second memory range.

Example 36 may include the elements of example 35, and may further comprise means for processing, using the encryption circuitry, the request based on the indicator prior to forwarding the request to a memory controller in the processing circuitry.

Example 37 may include the elements of any of examples 34 to 36, and may further comprise means for receiving a request to read from or write to a memory address, means for determining whether the memory address is in the first memory range or second memory range, means for setting an indicator based on whether the memory address falls within the first memory range or the second memory range and means for processing, using the encryption circuitry, the request based on the indicator prior to forwarding the request to a memory controller in the processing circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device equipped with protection for a trusted operating system, comprising:
   memory circuitry into which virtual machines are loaded during operation of the device, at least one of the virtual machines operating as a trusted execution environment including at least a trusted operating system; and
   processing circuitry to at least load the virtual machines into the memory circuitry, the processing circuitry including encryption circuitry to cryptographically protect a first range of memory in the memory circuitry in which the trusted operating system is loaded;
   wherein the encryption circuitry comprises at least one register to identify ranges of memory to cryptographically protect;
   wherein the encryption circuitry is to cryptographically protect a second range of memory in the memory circuitry in which data associated with the virtual machine operating as a trusted execution environment will be loaded;
   wherein the processing circuitry is to receive a request to read from or write to a memory address, determine whether the memory address is in the first memory range or second memory range and set an indicator based on whether the memory address falls within the first memory range or the second memory range.

2. The device of claim 1, wherein the encryption circuitry is a memory encryption engine included in processing circuitry based on Secure Guard Extensions (SGX) technology.

3. The device of claim 1, wherein hardware reserved security metadata is also loaded in the first range of memory during operation of the device.

4. The device of claim 1, wherein the at least one register includes a base address, a size of memory to protect and at least one cryptographic key corresponding to the range of memory.

5. The device of claim 1, wherein the encryption circuitry is to cryptographically protect a third range of memory in the memory circuitry in which a virtual machine manager is loaded.

6. The device of claim 5, wherein the memory circuitry comprises boot circuitry including at least boot code to be executed by the processing circuitry during device initialization, the boot code causing the processing circuitry to select the third range of memory and to write data to the at least one register based on the selected third range of memory.

7. The device of claim 5, wherein the virtual machine manager is to select the first range of memory in which the trusted operating system is to be loaded and write data based on the selected first range of memory to the at least one register.

8. The device of claim 1, wherein the processing circuitry comprises a memory controller and the encryption circuitry is to process the request based on the indicator prior to forwarding the request to the memory controller.

9. A method for protecting a trusted operating system, comprising:
   initializing a device;
   loading a virtual machine manager into memory circuitry in the device;
   selecting, using the virtual machine manager, a first range of memory in the memory circuitry in which to cryptographically protect a trusted operating system;
   updating processing circuitry in the device based on the selected first memory range;
   selecting, utilizing the virtual machine manager, a second range of memory in the memory circuitry in which to cryptographically protect data associated with the virtual machine operating as a trusted execution environment; and
   updating processing circuitry in the device based on the selected second memory range.

10. The method of claim 9, wherein the trusted operating system is associated with a virtual machine operating as a trusted execution environment to be loaded in the memory circuitry.

11. The method of claim 9, wherein loading the virtual machine manager comprises: executing boot code using the processing circuitry; selecting a third memory range in which to cryptographically protect the virtual machine manager; loading the virtual machine manager; authenticating the virtual machine manager; and updating the processing circuitry based on the selected third memory range.

12. The method of claim 9, wherein updating the processing circuitry comprises writing data regarding to a register associated with encryption circuitry in the processing circuitry.

13. The method of claim 12, further comprising: receiving a request to read from or write to a memory address; determining whether the memory address is in the first memory range or second memory range; and setting an indicator based on whether the memory address falls within the first memory range or the second memory range.

14. The method of claim 13, further comprising: processing, using the encryption circuitry, the request based on the indicator prior to forwarding the request to a memory controller in the processing circuitry.

15. At least one non-transitory machine-readable storage medium having stored thereon, individually or in combination, instructions for protecting a trusted operating system that, when executed by one or more processors, cause the one or more processors to:
   initialize a device;
   load a virtual machine manager into memory circuitry in the device;
   select, using the virtual machine manager, a first range of memory in the memory circuitry in which to cryptographically protect a trusted operating system; and
   update processing circuitry in the device based on the selected first memory range;
   select, utilizing the virtual machine manager, a second range of memory in the memory circuitry in which to cryptographically protect data associated with the virtual machine operating as a trusted execution environment; and update processing circuitry in the device based on the selected second memory range.

16. The storage medium of claim 15, wherein the trusted operating system is associated with a virtual machine operating as a trusted execution environment to be loaded in the memory circuitry.

17. The storage medium of claim 15, wherein the instructions to load the virtual machine manager comprise instructions to:
execute boot code using the processing circuitry;
select a third memory range in which to cryptographically protect the virtual machine manager;
load the virtual machine manager;
authenticate the virtual machine manager; and update the processing circuitry based on the selected third memory range.

18. The storage medium of claim 15, wherein the instructions to update the processing circuitry comprise instructions to write data regarding to a register associated with encryption circuitry in the processing circuitry.

19. The storage medium of claim 18, further comprising instructions that, when executed by one or more processors, cause the one or more processors to:
receive a request to read from or write to a memory address;
determine whether the memory address is in the first memory range or second memory range; and
set an indicator based on whether the memory address falls within the first memory range or the second memory range.

20. The storage medium of claim 19, further comprising instructions that, when executed by one or more processors, cause the one or more processors to: process, using the encryption circuitry, the request based on the indicator prior to forwarding the request to a memory controller in the processing circuitry.

* * * * *